Oct. 18, 1966 L. H. KRAMLICH 3,279,632
BACK HOE EXCAVATOR
Filed Nov. 27, 1964 5 Sheets-Sheet 1
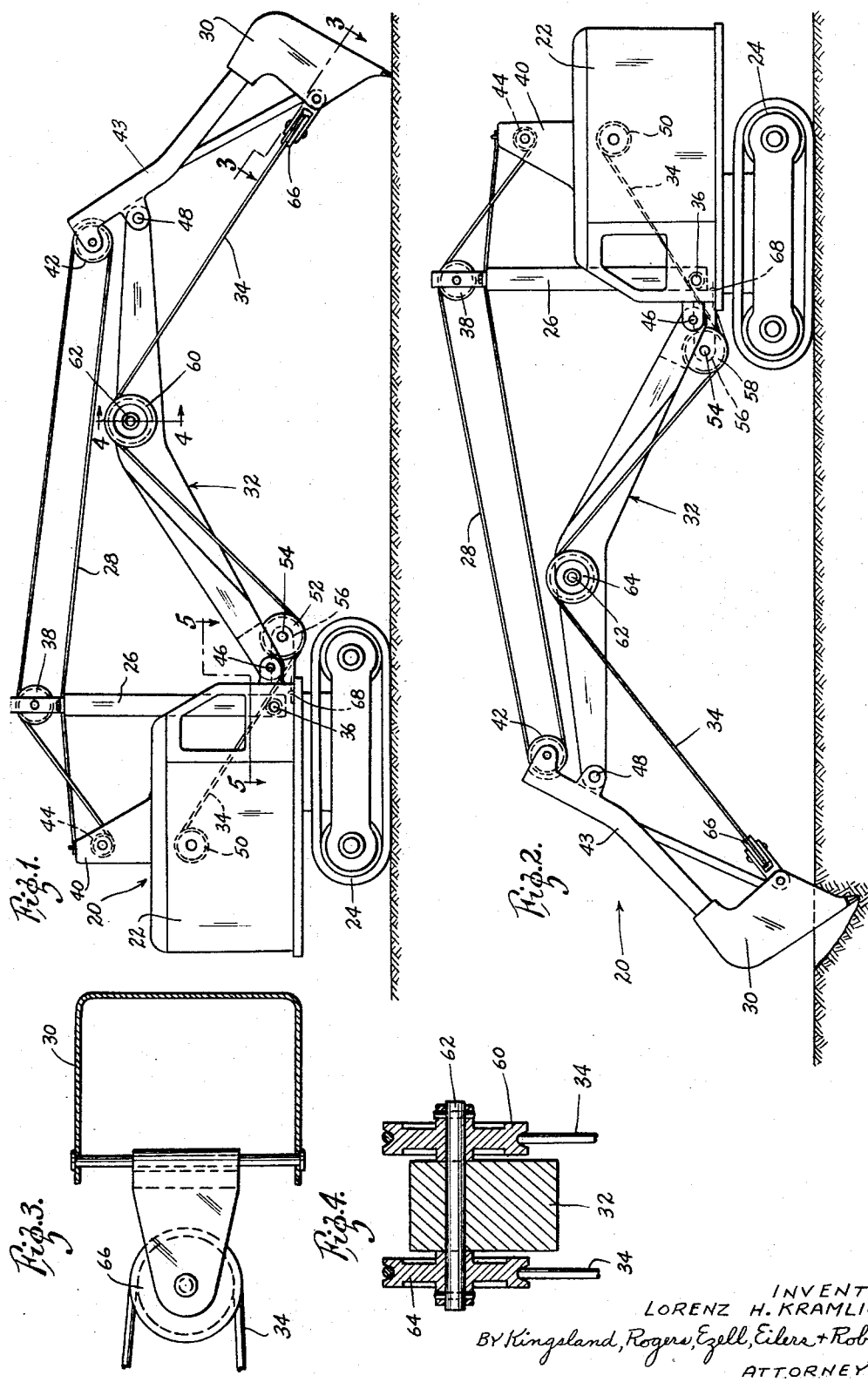
INVENTOR:
LORENZ H. KRAMLICH,
By Kingsland, Rogers, Ezell, Eilers + Robbins
ATTORNEYS

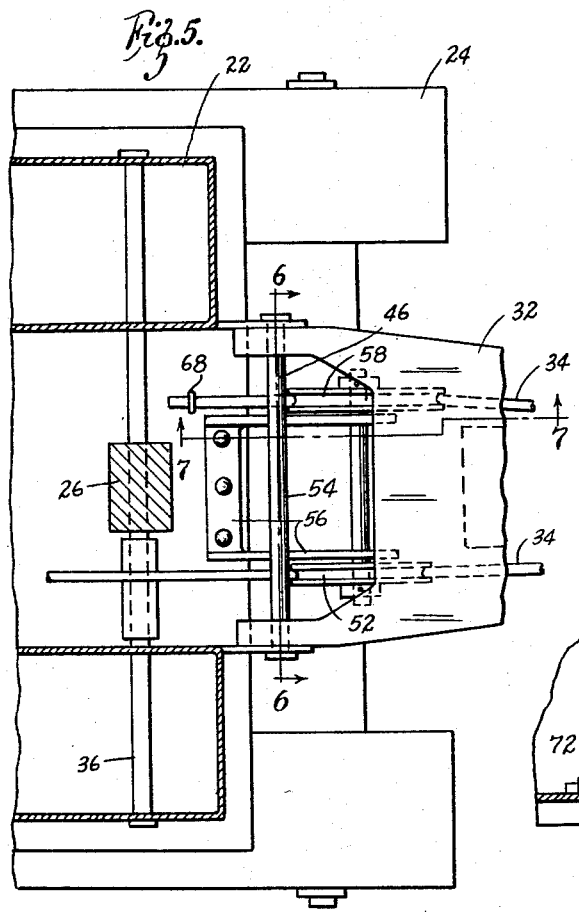
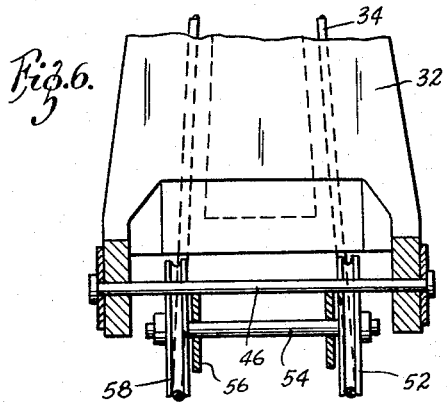
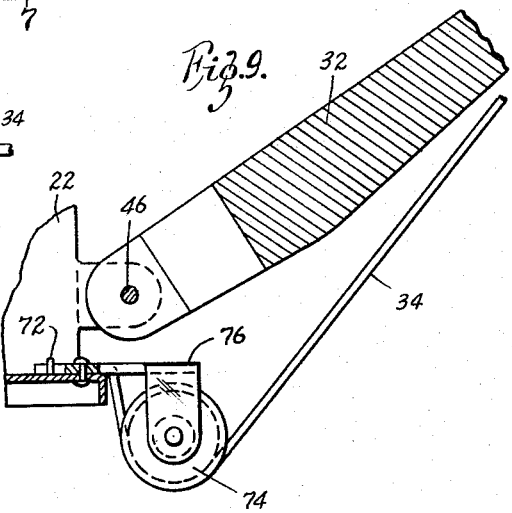
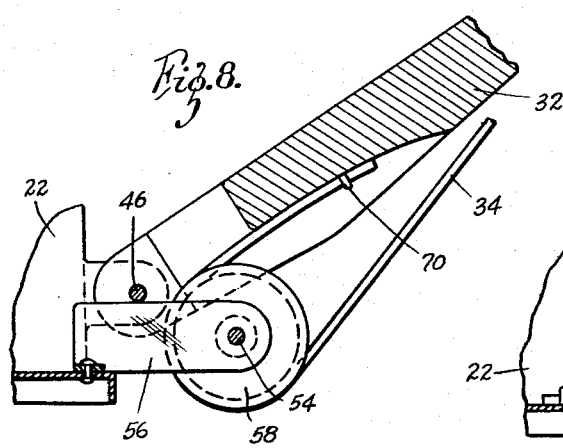
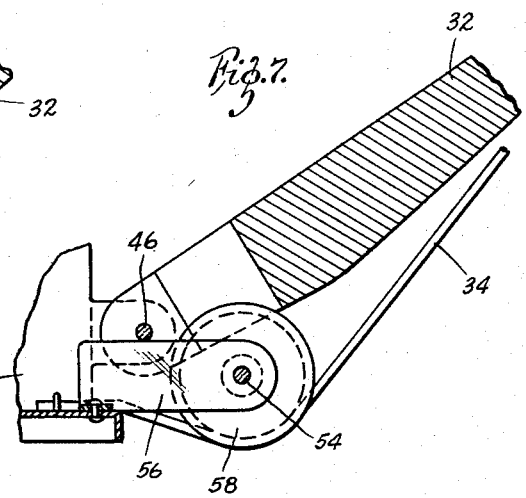
INVENTOR:
LORENZ H. KRAMLICH,
By Kingsland, Rogers, Ezell, Eilers & Robbins
ATTORNEYS

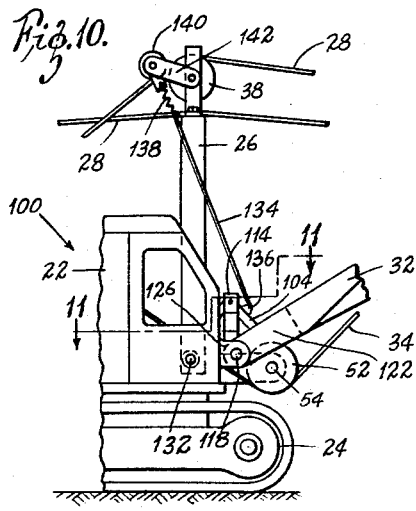
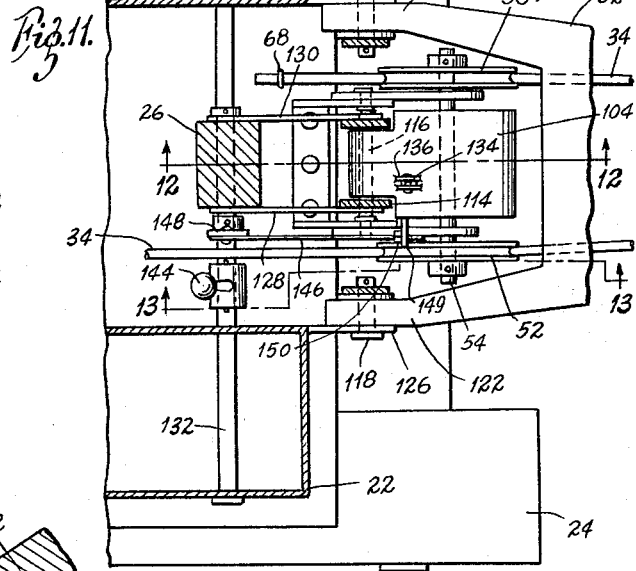
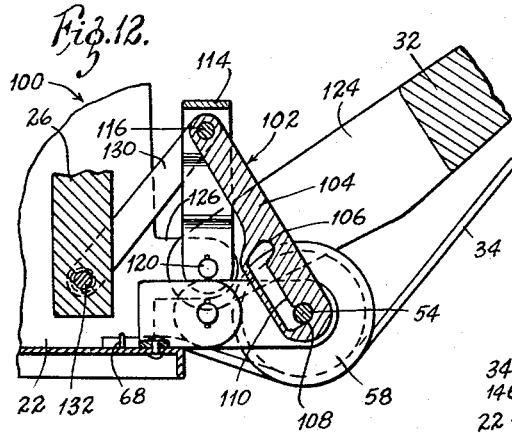
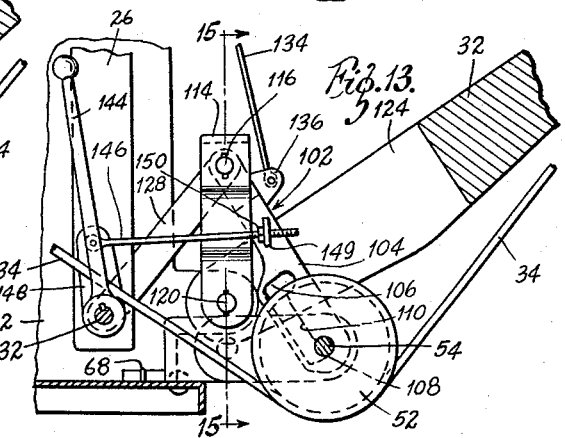
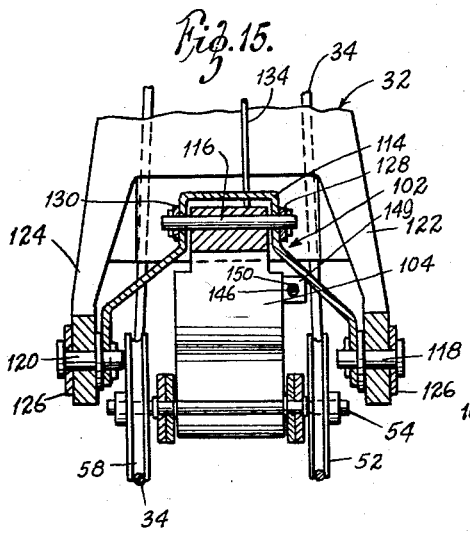

Oct. 18, 1966 L. H. KRAMLICH 3,279,632
BACK HOE EXCAVATOR
Filed Nov. 27, 1964 5 Sheets-Sheet 4
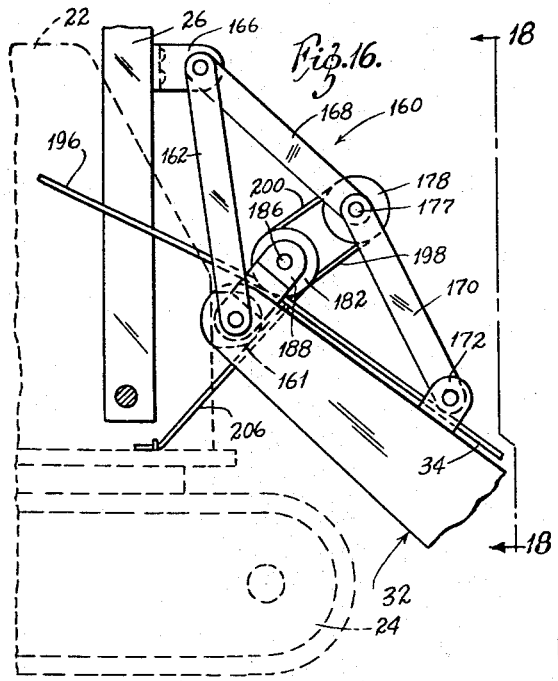
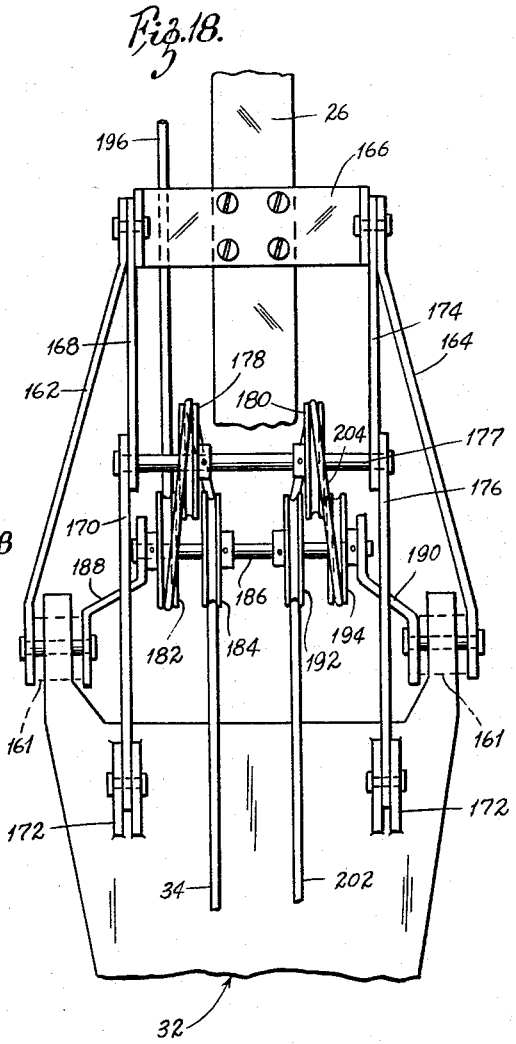
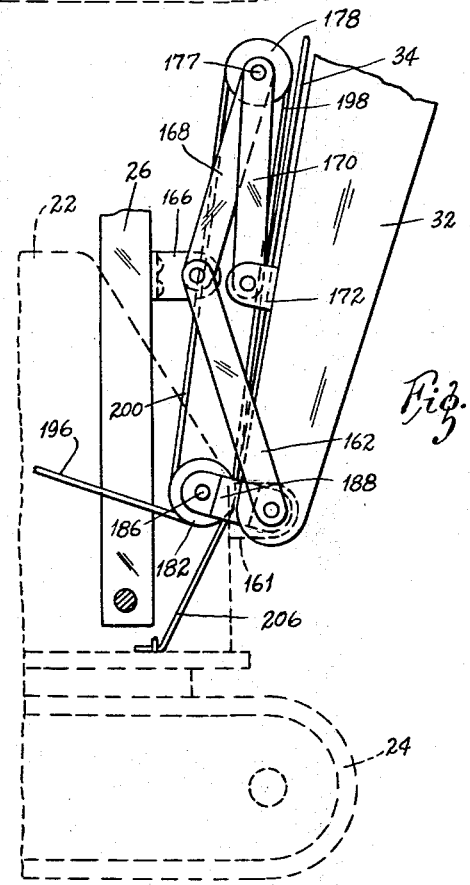
INVENTOR:
LORENZ H. KRAMLICH,
BY Kingsland, Rogers, Ezell, Eilers & Robbins
ATTORNEYS Oct. 18, 1966  L. H. KRAMLICH  3,279,632
BACK HOE EXCAVATOR Filed Nov. 27, 1964  5 Sheets-Sheet 5

INVENTOR:
LORENZ H. KRAMLICH,
BY Kingsland, Rogers,
Ezell, Eilers & Robbins
ATTORNEYS United States Patent Office 3,279,632
Patented Oct. 18, 1966

3,279,632
BACK HOE EXCAVATOR
Lorenz H. Kramlich, 12162 Cheryl Court, St. Louis, Mo.
Filed Nov. 27, 1964, Ser. No. 414,387
7 Claims. (Cl. 214—138)

This invention relates to improvements in back hoe excavators and in particular is concerned with a means for utilizing the free energy in the drag cable to provide a downward or crowding force upon the boom in digging operations.

In the past, back hoe excavators have been conventionally provided, which are operated from the end of a boom and a cable arrangement from a crawler mounted cab to scoop or dig a hole toward the cab. This is a conventional back hoe shovel operation, and the raising and lowering of the scoop shovel are conventionally provided for by power driven drums to manipulate the cables and to properly position the shovel. Such back hoe excavators have in the past been subject to difficulty in riding out of the ground when they strike a hard obstruction in the ground. This riding out of the ground is caused by the shovel moving upward and over the obstruction, which may be hard compacted earth, loose rock, or the like. In such back hoe excavators, a cable has been conventionally run from a power drum in the cab over a sheave on the middle of the boom, and from there to another sheave or pulley on the shovel to cause its pivotal movement, and from there the cable is conventionally run back to the boom and deadended usually in the middle of the boom.

By means of this invention, the free energy of the cable is employed by utilizing two main forces. The first force may be obtained by running the cable from the power drum on the cab, underneath a sheave at the bottom of the cab, and from there upwards to the sheave at the medial section of the boom to the shovel. This provides a downward or crowding force which in different embodiments may provide a pulling or pushing force upon the boom to resist the riding out of the shovel when it encounters obstructions. The second force is provided by extending the deadend cable from the medial section of the boom down underneath the aforementioned sheave at the bottom of the cab and underneath the supported end of the boom to a deadend position, either on the boom itself or upon the cab. This arrangement provides for a further downward force upon or crowding of the boom to resist its upward movement. The aforementioned two forces may be used singly or in combination to provide a utilization of the free energy in the cable, and to greatly increase the downward and crowding forces upon the boom.

The features described above are objects of this invention and further objects will appear in the detailed description which follows, and will be otherwise apparent to those skilled in the art.

For the purpose of illustration, a preferred embodiment of the invention is shown in the accompanying drawings. It is to be understood that these drawings are for the purpose of illustration only and that the invention is not limited thereto.

In the drawings:

FIGURE 1 is a view in elevation of the back hoe excavator taken from the right side thereof;

FIGURE 2 is a view in elevation taken from the left side of the back hoe excavator showing a beginning stage in a digging operation;

FIGURE 3 is an enlarged view in section taken on the line 3—3 of FIGURE 1;

FIGURE 4 is an enlarged view in section taken on the line 4—4 of FIGURE 1;

FIGURE 5 is an enlarged view in section taken on the line 5—5 of FIGURE 1;

FIGURE 6 is an enlarged view in section taken on the line 6—6 of FIGURE 5 showing the pivotal arrangement of the boom with respect to the cab;

FIGURE 7 is a view in section on line 7—7 of FIGURE 5 showing the means for deadending the drag cable on the cab;

FIGURE 8 is a view taken similarly to FIGURE 7 but showing the drag cable deadended on the underneath side of the lower end of the boom;

FIGURE 9 is a view taken similarly to FIGURE 7 but showing the drag cable deadended on the frame of the cab after passing around a sheave that is lowered to provide additional downward thrust;

FIGURE 10 is a view in side elevation of a modification showing means for adjusting the sheaves relative to the boom;

FIGURE 11 is an enlarged view in section taken on the line 11—11 of FIGURE 10;

FIGURE 12 is a view in section taken on the line 12—12 of FIGURE 11;

FIGURE 13 is a view in section taken on the line 13—13 of FIGURE 11;

FIGURE 14 is a sectional view similar to FIGURE 13 but showing a sheave in a different position of adjustment;

FIGURE 15 is a view in section taken on the line 15—15 of FIGURE 13;

FIGURE 16 is a view in side elevation of a further modification of this invention utilizing a downward pushing force on the boom created from the drag line;

FIGURE 17 is a view in side elevation similar to FIGURE 15 but showing the boom in a raised position;

FIGURE 18 is a view in section taken on the line 18—18 of FIGURE 16;

Figure 19:
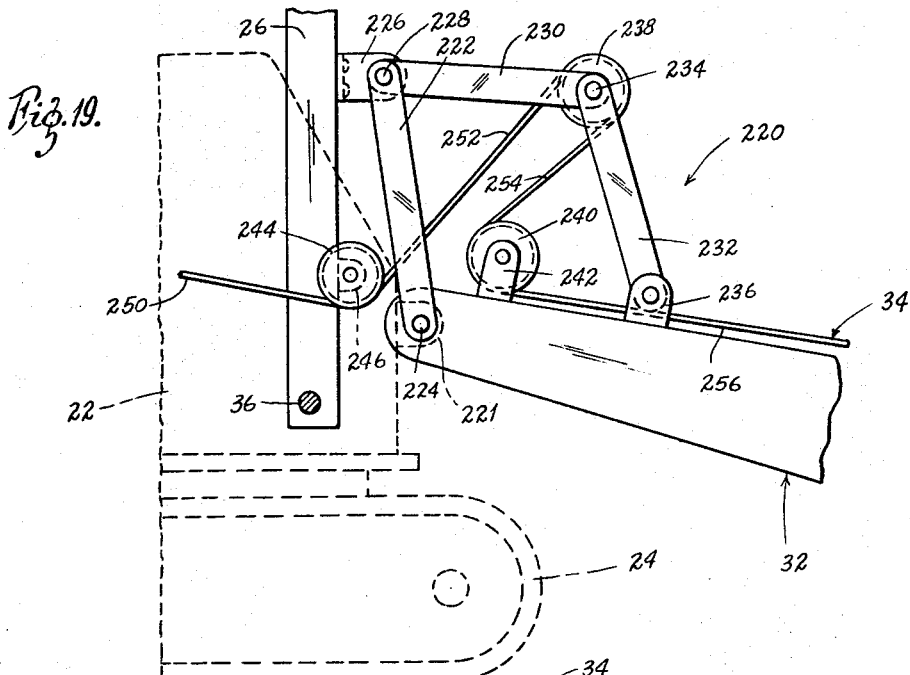
FIGURE 19 is a view in side elevation of a further modification of this invention somewhat similar to that of FIGURE 16 but showing a somewhat different method of reeving the drag line cable.

Referring now to the drawings, the back hoe excavator is generally indicated by the reference numeral 20 in FIGURES 1 and 2. As there shown, it comprises a rotary power cab 22 mounted upon a crawler 24. It is further provided with a conventional mast 26 supporting a hoist cable 28 to raise and lower the back hoe shovel 30. A boom 32 is pivoted from the cab and through sheave arrangement supports and guides a drag cable 34 for properly positioning the drag shovel.

The mast and hoist cable, defined more particularly, comprise mounting of the mast 26 upon a shaft 36 in order that the mast may oscillate to a slight degree about the horizontal axis of the shaft 36. The mast is further provided with a sheave 38, which receives the hoist cable 28. The hoist cable is anchored at the top of a brace 40, mounted at the top of the cab at one end and from there passes through a sheave 42 mounted at the top of the shovel boom 43, and is then guided through the sheave 38 and is anchored upon a power drum 44 at its other end.

The drag boom 32 is mounted upon the cab 22 by connection to a horizontal shaft 46, as best shown in FIGURES 1 and 5. The opposite end of the boom is connected to the shovel boom 43 by a pivot shaft 48.

The drag cable 34 arrangement will now be described. The drag cable 34 is connected at one end to a power drum 50 mounted in the cab. From this drum the cable is guided underneath a sheave 52, which is mounted upon a shaft 54, journalled within a support bracket 56 connected to the floor of the cab. The shaft 54 further supports a sheave 58 at the opposite end as shown in FIGURE 5. From the sheave 52 the cable passes over sheave 60 mounted upon a shaft 62, passing through the boom. At the other end of the shaft there is supported another sheave 64. The cable then passes from sheave 60 through a pulley sheave 66 connected to the shovel, and from there it is returned back over the sheave 64 and underneath the previously described sheave 58, and under the shaft 46 to be anchored by anchor pin 68 upon the cab floor, as shown in FIGURE 7. This means for anchoring the deadend of the cable is one embodiment of the anchoring means, and additional embodiments are shown in FIGURES 8 and 9.

In FIGURE 8 the deadend of the cable is shown wound around the sheave 58 and anchored by anchoring pin 70 on the underneath side of the lower end of the boom, while in FIGURE 9 the deadend of the drag cable is shown anchored by an anchoring pin 72 upon the cab floor, but is guided under a sheave 74 supported from the cab by a bracket 76 at a relatively lower position than sheave 58, shown in FIGURES 1 through 7, to provide additional thrust for downward crowding.

A modification of the invention is shown in FIGURES 10 through 15 providing for adjustment of the position of the sheaves 52 and 58. This modification, identified by the reference numeral 100 provides, through a latching device 102, means for varying the position of the shaft 54 of the sheaves 52 and 58. A latching device 102 comprises a latch plate 104 provided with two notches 106 and 108, connected by a passage 110. The latch plate is pivoted to a bracket 114 by a shaft 116. The bracket in turn is pivoted from and supported upon shafts 118 and 120, which also serve to support the boom end, which is shown in bifurcated form having arms 122 and 124, respectively. This support is effected upon lugs 126 extending from the cab at either side.

The shaft 116 is further connected to a pair of support arms 128 and 130, which are pivotally connected at their opposite end to shaft 132. Shaft 132 further serves as a support for the mast 26. The latch mechanism is adapted to be urged in the upward direction by cable 134 connected to a lug 136, positioned on the plate, as shown in FIGURE 13. The other end of the cable 134 is provided with a spring 138 connected to an idler pulley 140 pivotally supported on the top of the mast by an arm 142 to ride upon the hoist cable 28. It will be understood that the idler pulley 140 may be raised or lowered depending upon whether the hoist cable 28 is taut or slackened.

A hand lever 144 is keyed to the shaft 132 and provided with an actuating arm 146 connected to a lever 148 at one end, and to a lug 149 positioned on the side of the latch plate 104, as best shown in FIGURES 11 and 13. A stop nut 150 can be threaded upon the end of the rod 146 to provide for adjustment.

Through the mechanism of FIGURES 10 through 15, as will be more fully described hereinbelow, the sheaves 52 and 58 may be lowered or raised with respect to the pivot point of the boom to engage notches 106 and 108 to provide a greater or lesser downward crowding force upon the boom.

In the modification of FIGURES 16 to 18, a further embodiment is shown for providing a downward or crowding force upon the boom, which is effected by pushing upon the boom rather than pulling on the underneath side. This embodiment, identified by the reference numeral 160, employs a bifurcated base end of the boom pivotally supported by lugs 161 from the cab and connected to the mast 26 by pivotal arms, which also support specially arranged sheaves through which the drag cable is reeved. Thus, the base end of the boom is connected by a pair of arms 162 and 164, as shown in FIGURE 18, to the bracket 166 mounted upon the mast 26. A pair of additional braces 168 and 170 are pivoted to one another at their ends and likewise pivotally connected at the bracket and upon the boom at lug 172. A similar pair of braces 174 and 176 connect the boom to the bracket and the lug 172 at the opposite side of the boom. A shaft 177 passes through the two pairs of brace arms and provides the pivot connection.

The shaft 177 further supports sheaves 178 and 180 to accommodate the drag line. Associated with the sheave 178 are a pair of lower sheaves 182 and 184, which are mounted upon a shaft 186 supported by the pair of brackets 188 and 190 affixed to the bottom of the two boom arms. Likewise, the sheave 180 is associated with a pair of sheaves 192 and 194 similarly mounted upon the shaft 186.

In the embodiment of FIGURES 16 through 18, the drag line cable 34 is connected, as shown in FIGURE 16, at the upper left hand portion to a cable drum, not shown, and is passed through section 196 under the sheave 182 and then, in section 198, over the top of sheave 178 and then in section 200 down and underneath sheave 184, over the medial portion of the boom, and the sheave mounted thereon, as in FIGURE 1, around the sheave 66 mounted on the shovel and back over the sheave mounted on the medial portion of the boom in flight 202 undereneath sheave 192 over sheave 180 and then in flight 204 down and undereneath sheave 194 and then anchored at flight 206 upon the floor of the cab.

Figure 20:
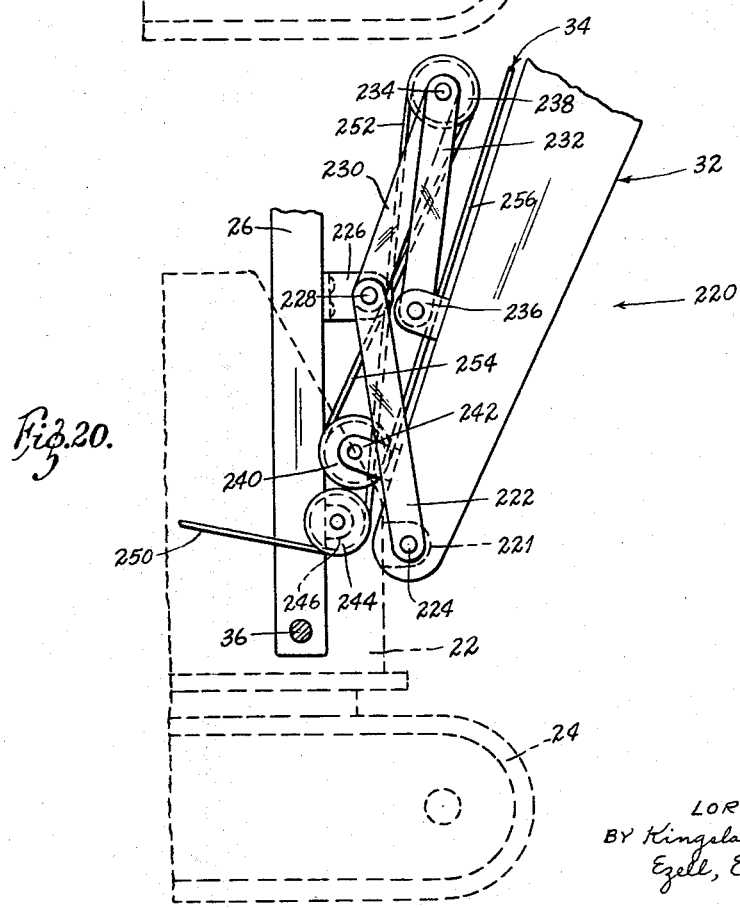
FIGURE 20 is a view similar to FIGURE 19 but showing the boom in a different position.

A further modification of this invention is shown in FIGURES 19 and 20. This modification, identified by the reference numeral 220, is somewhat similar to that shown in FIGURES 16 through 18 in that the downward crowding of the boom is effected by a pushing action rather than a pulling action. In this embodiment, the boom is pivotally supported upon the cab by lugs 221 and is connected by an arm 222 pivotally connected at one end to the boom by shaft 224, at the other end to an ear or lug 226 connected to the mast. A pivotal means 228 effects this connection. A pair of arms 230 and 232 are pivotally connected to each other by a shaft 234, and these arms are in turn respectively pivotally connected to the member 228 and to a lug 236 mounted upon the boom at a point spaced from its end.

The shaft 234 also carries a sheave 238. A further sheave 240 is mounted upon the boom on lugs 242 at a point intermediate the lug 236 and the pivoted end of the boom. An additional sheave 244 is mounted upon a projecting lug 246 connected to the lower end of the mast 26.

In this embodiment the drag cable 34, as in the embodiment of FIGURES 16 through 18, is connected to the cable drum, not shown, and then in flight 250 is passed under the sheave 244, and then in flight 252 over the sheave 238 and then in flight 254 underneath the sheave 240 from which point at flight 256 it is passed over the medial sheaves mounted upon the boom to the shovel and back again. It will be understood that when passing the cable back again it may be deadended at the medial portion of the boom, or it will be understood that the sheaves 238 and 240 may be both double tracked, in which event the cable can be passed underneath the sheave 240 and then up and around the sheave 238, and from the sheave 238 it may be deadended upon the cab to provide an additional crowding force where desired.

The means for adjusting the position of the sheaves 52 and 58, shown in FIGURES 10 through 15, will now be described. This embodiment controls the location of the sheaves to provide varying forces as needed to force down on the boom in a crowding action. The lower the sheaves 52 and 58 the greater is the effect of the drag cable in this crowding action on the boom, and the lowest position is dictated by the dimensions of the crawler. The lowest position, such as that shown in FIGURES 10 through 13 and 15, is desired for hard digging or rapid scoop loading in an unlimited area, or to crowd the scoop against a vertical back in a deep excavation. The raised position shown in FIGURE 14, where the sheaves are elevated, is employed when the scoop is filled and is ready to be hoisted, or when the material to excavate is fairly soft and the scoop will penetrate without any great amount of force required. It will be understood that the adjustment mechanism may be varied from the latched means shown.

The latch means is operated by adjustment of the hand lever 144, which urges the latch plate 104 counterclockwise about its pivot point 116. Thus, from the position shown in FIGURE 13, simple adjustment is made, since the sheaves 52 and 58 pivotally mounted upon the arms 131 are urged upwardly due to the tension upon the drag cable 34, which passes underneath the sheaves and urges them to an elevated position. Thus, when this operation is effected, the shaft 54 will be disengaged from the notch 108 and urged upwardly into the notch 106 to the position shown in FIGURE 14.

When the hoist line 28 is taut, i.e., when the shovel is being hoisted, the latch will always be biased toward the up position, such that the sheaves will be elevated and the shaft will be engaged in the notch 106. This is effected when the hoist line 28 is taut and the scoop is hoisted, since the cable 134 tends to pull the latch plate up due to the tautening of the hoist line which urges the idler pulley 140 upwardly. When the hoist line 28 is slack, the latch plate 104 may be operated and the sheaves, if in the up position, can be simply returned to the lower position. This is accomplished by having the operator engage the lever 144 and operate it to cause the operating arm 146 to move the latch plate to the counterclockwise direction, as viewed in FIGURE 13. In this operation the shaft 32 and the sheaves are lowered by gravity when the drag cable 34 is slackened so that the shaft is engaged in the bottom notch 108.

In the embodiment of FIGURES 16 through 18, there is shown a means for urging the boom downwardly in which the reeving of the cable is all above the pivot end of the boom so that the boom is pushed rather than pulled to crowd it downward. Thus, in this embodiment a downward force is employed without the requirement of utilizing any cables or sheaves under the boom pivot point. In this operation, as the boom is lowered, the pivot point 167 on the bracket 166 attached to the mast, and pivot point 173 on the two lugs 172 and 174 on the boom, move farther apart, as shown by comparison of FIGURES 16 and 17. Because of this, and the way the drag cable is reeved, tension is applied and the boom is forced downwardly. Further, in this arrangement, through the positioning of the brace arms, it will be noted that the paired sheaves connected on the base end of the boom on shaft 186 and those connected between the arms 168 and 170 on the shaft 177 are caused to move toward one another, due to the tension applied upon the cable, and, in so doing, urge the arms 168 and 170 toward an in-line position to urge the boom downwardly.

In the embodiment of FIGURES 19 and 20, a similar arrangement is shown for that of FIGURES 16 through 18. However, in this arrangement, a different positioning of the sheaves is employed where one sheave can be mounted upon the mast in addition to those mounted upon the lower boom end. However, a downward crowding force is likewise applied through the reeving employed wherein all of the sheaves and cable flights are located above the pivot point of the boom to effect the downward crowding of the boom by a pushing action.

*Operation*

The operation of the back hoe excavator of this invention is effected as in conventional back hoe excavators. Thus, to effect raising and lowering of the shovel with respect to the ground, the power drum 44 is operated to either reel in or play out the hoist cable 28. When the cable is reeled out the shovel 30 and the boom 32 will be lowered, and, conversely, when the cable is reeled in the boom 32 and the shovel 30 will be elevated. Thus, in this manner, the shovel may be raised or lowered at will.

The shovel may be pivoted toward or away from the cab about pivot shaft 48 by reeling in or playing out cable respectively from the power drum 50. Thus, the back hoe shovel 30 is operated in conventional fashion, which can be seen by comparison of FIGURE 2 with FIGURE 1 where the shovel has been lowered by reeling out hoist cable 28, and has been pivoted toward the cab in a "bite-in" operation to excavate earth in the beginning of a digging operation. This is effected by taking up the drag 34 by reeling in upon the power drum 50. In the "bite-in" or digging operation shown in FIGURE 2, the take up of the drag cable 34 causes two downward forces to come into play to prevent the shovel from riding out of the ground when hard earth or obstructions are encountered. These two downward forces crowd the shovel down and represent a downward force that has been added through this invention. The first of these downward forces comes into play as the drag cable 34 passes under the sheave 52 and over the sheave 60. This force urges the boom downwardly by a pulling force on the medial portion of the boom, and as viewed in FIGURE 1, provides torque in a clockwise direction about the pivot shaft 46 connecting the boom to the cab.

The second downward force comes into play through the passage of the deadend portion of the cable over the sheave 64 and underneath the sheave 58 to its deadend connection either to the boom or the cab, as shown in the various embodiments in FIGURES 7, 8, and 9. This deadend connection utilizes the live energy in the cable, and through the positioning of the sheave 58 underneath, that is to say lower than the shaft 46 connecting the boom to the cab, provides a downward force urging and crowding the boom 32 downwardly. The above two forces described can be used singly, by either deleting the sheave 58 or deadending the drag cable at the middle part of the boom, as in conventional practice, but it will be understood that their combined employment provides a combined force utilizing the energy of the drag cable for a greater crowding or downward force to resist the riding of the drag shovel out of the ground.

The various embodiments showing the anchoring of the deadend of the drag cable, illustrated in FIGURES 7, 8 and 9, are exemplary of various connections that can be employed to provide a downward force that actually pulls or urges the boom downwardly about the pivot point 46 to urge it clockwise from the position shown in FIGURE 1. Other arrangements may be employed, as will be well understood in the art as long as the deadend of the drag cable is connected to or passed about a pivot point, or otherwise deadended underneath the boom pivot point to urge the boom downwardly in the aforementioned crowding operation. This arrangement includes placing a sheave upon the pivot shaft 46, since in this arrangement a sheave having a large diameter will pass the drag cable underneath the effective center of pivot, that is, the axis of the shaft 46 so that a downward mechanical advantage can be employed.

Various changes and modifications may be made in this invention as will be readily understood by those skilled in the art. Such changes and modifications are within the scope and teaching of this invention as defined by the claims appended hereto.

What is claimed is:

1. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel underneath the pivotal connection of said boom upon said cab, said means comprising a sheave having a lower surface positioned underneath said pivotal connection, and means for varying said downward force comprising means for varying the position of said sheave with respect to said boom.

2. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel underneath the pivotal connection of said boom upon said cab, said means comprising a sheave having a lower surface positioned underneath said pivotal connection, and means for varying said downward force comprising means for varying the position of said sheave with respect to said boom, said last named means comprising a support for a shaft upon which said sheave is mounted, said support having means to receive said shaft in selected positions of adjustment.

3. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel around a sheave means associated with pivoted brace means operatively connected to support means above the boom adapted to exert a pushing force upon the top of the boom when said cable is under tension.

4. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel around a sheave means comprising a first sheave mounted on said boom and a second sheave mounted on a support relatively movable with respect to said boom; means connecting said support to said boom to exert a downward pushing force thereon when said cable is under tension.

5. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel around a sheave means comprising a first sheave mounted on said boom and a second sheave mounted on a support relatively movable with respect to said boom, means connecting said support to said boom to exert a downward pushing force thereon when said cable is under tension, said support comprising a pair of brace arms pivoted together at their ends and having their opposite ends pivotally connected to the cab and the boom and said second sheave being supported upon said arms.

6. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel underneath the pivotal connection of said boom upon said cab, said means comprising a sheave having a lower surface positioned underneath said pivotal connection, and means for varying said downward force comprising means for varying the position of said sheave with respect to said boom, and said sheave being biased toward an upward position when the boom is being hoisted by a means operatively controlled by the tension of a hoist cable.

7. In a back hoe excavator having a drag boom pivotally mounted at one end to a tractor mounted cab, a shovel pivotally mounted to a free end of said boom and means for raising and lowering said boom, the improvement comprising means for exerting a downward force upon said boom as the shovel is operated, said means comprising reeving an operating cable connecting a power drum mounted upon the cab with the shovel underneath the pivotal connection of said boom upon said cab, said means comprising a sheave having a lower surface positioned underneath said pivotal connection, and means for varying said downward force comprising means for varying the position of said sheave with respect to said boom, said last named means comprising a support for a shaft upon which said sheave is mounted, said support having means to receive said shaft in selected positions of adjustment, and said sheave being biased toward an upward position when the boom is being hoisted by a means operatively controlled by the tension of a hoist cable.

References Cited by the Examiner
UNITED STATES PATENTS

| | | | |
|---|---|---|---|
| 1,805,479 | 4/1931 | Burke | 214—138 |
| 2,084,718 | 6/1937 | Zeilman | 214—138 |
| 2,738,889 | 3/1956 | Fritsch | 214—138 |
| 3,073,465 | 1/1963 | Strnad | 214—138 X |
| 3,117,686 | 1/1963 | Brown | 214—138 |

FOREIGN PATENTS 754,045   8/1956   Great Britain.

HUGO O. SCHULZ, *Primary Examiner.*